(12) United States Patent
Fedorovskaya et al.

(10) Patent No.: US 7,271,809 B2
(45) Date of Patent: Sep. 18, 2007

(54) METHOD FOR USING VIEWING TIME TO DETERMINE AFFECTIVE INFORMATION IN AN IMAGING SYSTEM

(75) Inventors: Elena A. Fedorovskaya, Pittsford, NY (US); Serguei Endrikhovski, Rochester, NY (US); Tomasz A. Matraszek, Pittsford, NY (US); Kenneth A. Parulski, Rochester, NY (US); Jose M. Mir, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 896 days.

(21) Appl. No.: 10/079,283

(22) Filed: Feb. 19, 2002

(65) Prior Publication Data

US 2003/0165269 A1 Sep. 4, 2003

(51) Int. Cl.
*G09G 5/00* (2006.01)

(52) U.S. Cl. .......................... 345/581; 725/38

(58) Field of Classification Search ................ 345/421, 345/581; 358/3.04–3.22; 382/151, 209, 382/219, 288, 289, 291
See application file for complete search history.

(56) References Cited

U.S. PATENT DOCUMENTS

| | | | |
|---|---|---|---|
| 580,220 A * | 4/1897 | Black et al. .................. 105/77 |
| 5,666,215 A | 9/1997 | Fredlund et al. |
| 5,802,220 A * | 9/1998 | Black et al. ................. 382/276 |
| 6,160,536 A * | 12/2000 | Forest ......................... 345/157 |
| 6,449,422 B1 * | 9/2002 | Ebisawa ....................... 386/52 |
| 6,449,442 B1 * | 9/2002 | Shida et al. .................. 399/63 |
| 6,545,682 B1 * | 4/2003 | Ventrella et al. ............ 345/473 |
| 6,947,601 B2 * | 9/2005 | Aoki et al. ................. 382/235 |
| 7,089,237 B2 * | 8/2006 | Turnbull et al. ............... 707/5 |
| 2002/0018067 A1 * | 2/2002 | Carcia et al. ............... 345/473 |
| 2002/0077930 A1 * | 6/2002 | Trubey et al. ................ 705/26 |
| 2003/0033926 A1 | 2/2003 | Rothmuller et al. |
| 2003/0040958 A1 * | 2/2003 | Fernandes ..................... 705/14 |
| 2003/0063798 A1 * | 4/2003 | Li et al. ..................... 382/165 |

FOREIGN PATENT DOCUMENTS

JP 10143680 A * 5/1998
JP 2001 320743 A * 11/2001

OTHER PUBLICATIONS

"Looking at pictures: Affective, facial, visceral, and behavioral reactions", Psychophysiology, 30,□□ pp. 261-273, 1993, by P.J. Lang, M.K. Greenwald, M.M. Bradley, and A.O. Hamm.*

(Continued)

*Primary Examiner*—Matthew C. Bella
*Assistant Examiner*—G. F. Cunningham
(74) *Attorney, Agent, or Firm*—Raymond L. Owens (57) ABSTRACT

A method for determining affective information for at least one image in an imaging system includes sequentially displaying a plurality of digital images for viewing by a user; monitoring the viewing time for each of the plurality of digital images; and using the viewing time to determine affective information for at least one of the digital images.

5 Claims, 6 Drawing Sheets

OTHER PUBLICATIONS

"FotoFile: A Consumer Multimedia Organization and Retrieval System" by Kuchinsky et al.

I.A. Essa and A. Pentland, (1995) "Facial Expression Recognition using a Dynamic Model and Motion Energy", In Proceedings of the ICCV 95, Cambridge, MA.

J.J. Lien, T. Kanade, J.F. Cohn and C.C. Li, (2000) "Detection, Tracking, and Classification of Action Units in Facial Expression," Robotics and Autonomous Systems, 31, pp. 131-146, 2000.

Bartlett, M.S., Hager, J.C., Ekman, P., and Sejnowski, T.J., (1999) "Measuring facial expressions by computer image analysis", Psychophysiology, 36, pp. 253-263.

P. Ekman and W. Friesen, (1978) "Facial Action Coding System", Consulting Psychologists Press, Inc., Palo Alto, CA.

"Looking at pictures: Affective, facial, visceral, and behavioral reactions", Psychophysiology, 30, pp. 261-273, 1993, by P.J. Lang, M.K. Greenwald, M.M. Bradley, and A.O. Hamm.

* cited by examiner

| Personal Affective Tag |
|---|
| Personal Identification = User 1 |
| Viewing time = 00:00:15 |

*FIG. 6A*

| Personal Affective Tag #1 |
|---|
| Personal Identification = User 1 |
| Facial Expression = Smile |
| Smile Size = 1.5 |
| Preference = 1.5 |
| Emotional category = Strongly happy |
| Viewing time = 00:00:15 |
| Interest = 15 |
| Skin Conductance Response = 5µmho |
| Excitement = 5 |
| Importance = 21.5 |
| Date = 9/1/2000; 21:19:03 |
| Personal Affective Tag #2 |
| Personal Identification = User 2 |
| Facial Expression = No smile |
| Smile Size = 0 |
| Preference = 0 |
| Emotional category = Neutral |
| Viewing time = 00:00:02 |
| Interest = 2 |
| Skin Conductance Response = 1µmho |
| Excitement = 1 |
| Importance = 3 |
| Date = 9/1/2000; 21:19:03 |
| Personal Affective Tag #3 |
| Personal Identification = User 1 |
| Facial Expression = Smile |
| Smile Size = 1.1 |
| Preference = 1.1 |
| Emotional category = Somewhat happy |
| Viewing time = 00:00:10 |
| Interest = 10 |
| Skin Conductance Response = 3µmho |
| Excitement = 3 |
| Importance = 14.1 |
| Date = 10/1/2000; 18:32:44 |

*FIG. 6B*

METHOD FOR USING VIEWING TIME TO DETERMINE AFFECTIVE INFORMATION IN AN IMAGING SYSTEM

CROSS REFERENCE TO RELATED APPLICATIONS

Reference is made to commonly assigned U.S. patent application Ser. No. 09/721,222, filed Nov. 22, 2000, entitled "Method for Adding Personalized Metadata to a Collection of Digital Images" by Kenneth A. Parulski et al; Ser. No. 10/036,113, filed Dec. 26, 2001, entitled "Method for Creating and Using Affective Information in a Digital Imaging System" by Tomasz Matraszek et al; Ser. No. 10/036,123, filed Dec. 26, 2001, entitled "Method for Using Affective Information Recorded With Digital Images for Producing an Album Page" by Tomasz Matraszek et al; Ser. No. 10/036,157, filed Dec. 26, 2001, entitled "An Image Format Including Affective Information" by Tomasz Matraszek et al; Ser. No. 10/079,646, filed Feb. 19, 2002, entitled "Method for Providing Affective Information in an Imaging System" by Elena A. Fedorovskaya et al.; and Ser. No. 10/079,284, filed Feb. 19, 2002, entitled "Method for Using Facial Expression to Determine Affective Information in an Imaging System" by Serguei Endrikhovski et al., the disclosures of which are incorporated herein by reference.

FIELD OF THE INVENTION

The present invention relates to imaging systems and, more particularly, to systems which monitor the time that a user views each image in a set of digital images, to determine the user's reaction to the digital images.

BACKGROUND OF THE INVENTION

Digital images, from digital cameras or scanned photographic film, can be viewed, stored, retrieved, and printed using a home computer, or can be uploaded to a website for viewing, as described in commonly assigned U.S. Pat. No. 5,666,215 to Fredlund et al. Using a web browser, a group of these digital images can be viewed and selected for printing, or it can be sent electronically to other family members and/or friends.

Currently, the usage of the Internet or personal computers and printing devices for picture printing, sharing and storage is growing. Customers create large personal databases of images on the computers and web servers. It is becoming increasingly important to classify or catalog images for subsequent use. Images can be organized into categories according to the people, places, subjects or events depicted, as described in a paper entitled "FotoFile: A Consumer Multimedia Organization and Retrieval System" by Kuchinsky et al. This paper describes such categories or attributes that are used to tag certain images, including a "favorite" attribute that is loosely defined as referring to the "best" images in a user's collection. Classifying images based on user's preference toward favorite images helps to quickly retrieve and share those valuable images. In this paper, the "favorite" attribute could only be used to mark and retrieve specific user's images on their home PC, since there is nothing in the "favorite" attribute designating which user has indicated that this is a "favorite" image. Moreover, this attribute, as it is suggested by Kuchinsky et al., does not allow any systematic differentiation with respect to the degree of preference within the images already marked as favorite images. As a result, after a certain time of acquiring images in the user's PC database, the number of favorite images bercomes too large to serve the purpose of the favorite attribute, unless the user will change the attribute for every image in his or her database, which is a lengthy and tiresome process. In addition, the concept of the "best" image does not necessarily refer to a user's emotional reaction.

Consequently, a need exists for an improved method for recording and interpreting the user's emotional reaction to an image for subsequent association of this affective information with a corresponding image and a user identifier.

The present invention broadly defines affective information associated with the image to include various types of psychological reactions, such as affective, cognitive, physiological, or behavioral responses that are not found in any previous systems. It refers both to recorded raw signals and their interpretations.

SUMMARY OF THE INVENTION

It is an object of the present invention to provide affective information for images in an imaging system.

This object is achieved by a method for determining affective information for at least one image in an imaging system, comprising the steps of:

a) sequentially displaying a plurality of digital images for viewing by a user;

b) monitoring the viewing time for each of the plurality of digital images; and c) using the viewing time to determine affective information for at least one of the digital images.

ADVANTAGES

It is an advantage of the present invention to provide personalized affective information associated with digital images. This information provides for unique personal classification of such digital images for future possible usage, e.g. retrieval, communication and sharing, advertising and marketing.

It is an additional advantage of the present invention that affective information can be automatically determined by measuring the viewing time of a user.

It is a further advantage of the present invention to use the viewing time to determine the degree of interest of the user to digital images.

It is an additional advantage of the present invention that the viewing time is used to provide affective information, which is associated with a user identifier.

DETAILED DESCRIPTION OF THE INVENTION

The present invention provides a structure and method for capturing a user's reaction during the process of image viewing, such as on a display of a personal computer; and interpreting this reaction in terms of a degree of preference, importance, or a certain emotional category for subsequent association of this information and its interpretation with a specified image. The information about user's reaction to the image is based on automatically recording one or more of the following signals using physical or bio-metrical devices: the duration of time that the user views a certain image; the facial expression of the user while viewing the image; and the skin conductance of the user while viewing the image. Interpretation of the recorded information produces several gradations of user's preference, e.g. the degree to which the user likes the image and considers it to be his or her favorite image. It also provides a relative degree of importance or interest of the image to the user. Additionally, interpretation of such information classifies the recorded information in terms of the specific emotion, for example, happy or sad.

By images is meant still or moving images, or multimedia clips or fragments that include visual information. People create images for a variety of purposes and applications. Capturing memorable events is one example of an activity that ordinary people, professional photographers, or journalists alike have in common. These events are meaningful or emotionally important to an individual or a group of individuals. Images of such events attract special attention, elicit memories, feelings/emotions, or specific behavior. One can say that these pictures of special events and moments evoke certain mental or behavioral reactions or, in general terms, psychological reactions.

Often these psychological reactions are accompanied by physiological changes. Relevant information that represents or describes a particular user's reactions toward images in terms of user's affective, cognitive, physiological or behavioral responses are referred to in the present invention as affective information. The affective information can be attributable to memories and associations related to depicted events, as well as to a particular rendering of an image (image quality, beautiful picture, peculiar composition, specific people, etc.).

Affective tagging is defined as the process of determining affective information, and storing the affective information in association with the images. When the affective information is stored in association with a user identifier, it is referred to in the present invention as "personal affective information". When the personal affective information is stored in association with the corresponding image, it is referred to as "personal affective tag". The affective information and user identifier are types of image "metadata", which is a term used for any information relating to an image. Examples of other types of image metadata include image capture time, capture device, capture location, date of capture, image capture parameters, image editing history etc.

Affective information can be manually entered by a user, for example, using a mouse, keyboard, or voice recognition, or it can be collected automatically. The following are examples of methods for automatically collecting affective information:

The viewing time of the image, since a longer viewing time normally indicates that this is an important image;

Other behavioral/usage information related to the usage of this image, such as how many times the image was printed or sent to others via e-mail;

The facial expression of the user, which can be captured automatically by a video camera as the user views the image;

Body gestures recorded by a video camera as the user views the image;

The user's eye movements, such as the gaze path of the user while viewing the image;

The user's voice, recorded while viewing the image;

The pressure of the user's hand on the input device (e.g. joystick or mouse) recorded while viewing the image; and The user's biometric or physiological responses recorded as the user views the image. These can be any combination of signals, including galvanic skin response (GSR), EMG, Temperature, GSR, Heart Rate, brain waves EEG, brain-imaging signals, etc.

Affective information is determined automatically based on viewing time, the facial expression, and galvanic skin response.

Figure 1:
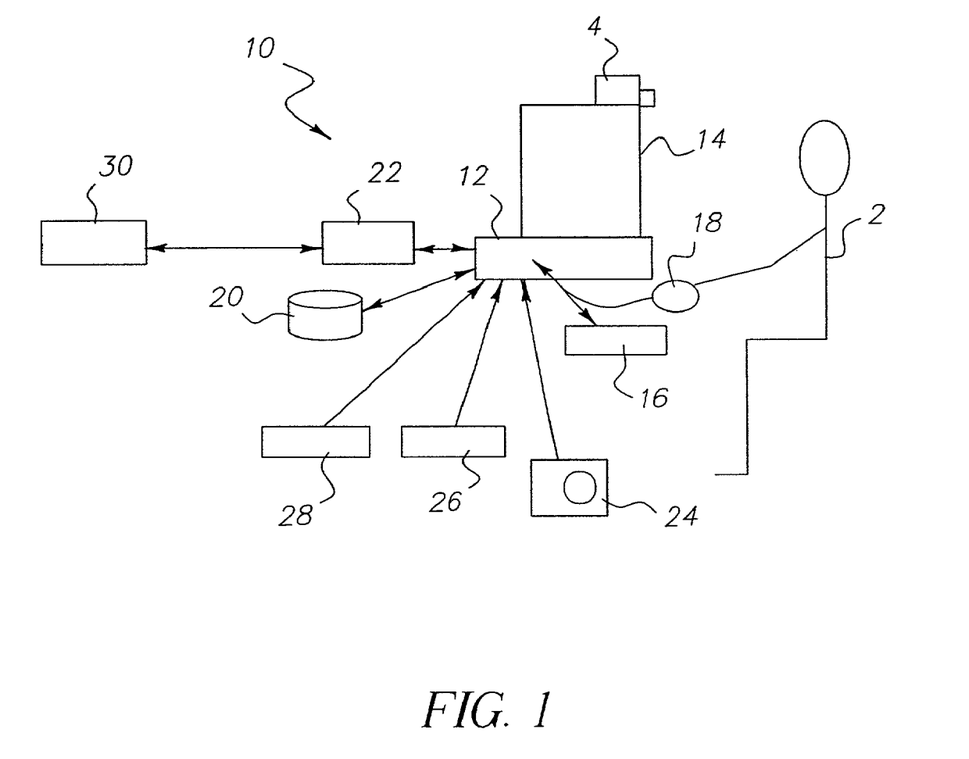
FIG. 1 depicts a block diagram of home computer system for providing affective information.

Referring to FIG. 1, there is illustrated a desktop computer system made in accordance with the present invention for providing personal affective information, associating it with image(s) as image metadata, and storing the images and the associated personal affective information.

The system depicted in FIG. 1 includes a home computer 10 (with associated peripherals) located at the user location (e.g. their home). It is understood that a system such as a TV set, game console, dedicated Internet appliance, set top box, Wireless PDA devices, telephone with the embedded display, retail kiosks, electronic picture frame devices, etc. may be substituted for the home computer system 10.

The home computer 10 is connected through a modem 22 or other communications interface to a communication service provider, such as an Internet service provider 30. The home computer 10 includes a CPU motherboard 12, a display monitor 14, and a hard drive storage device 20 that can store high resolution image files such as digital still or digital motion images and associated metadata.

The home computer includes various image input peripherals, including a scanner 28, a CD reader 26, and a digital camera 24. The scanner 28 is used to scan prints or film and produce digital images. The CD reader 26 is used to input digital images from a CD-R disk, such as a Kodak PictureCD (not shown). The user can also download images from a Service Provider using the modem 22. The home computer 10 can also connect to a local printer (not shown), such as an inkjet printer, to allow images to be printed at the user's home.

The digital camera 24 can be a digital still camera such as the Kodak DC 4800 digital camera manufactured by the Eastman Kodak Company, Rochester, N.Y. Alternatively, the digital camera 24 can be a digital motion camera such as the Kodak MC3 portable multimedia device, which records motion and sound video files, in addition to still images. The digital camera 24 connects to the home computer 10 via a cable employing a common interface, such as the well known Universal Serial Bus (USB) interface or the IEEE 1394 interface. Alternatively, digital camera 24 can connect to the home computer 10 using a wireless interface, such as the well known Bluetooth interface or the IEEE Standard 802.15 interface. Alternatively, the images can be transferred from the digital camera 24 to the home computer 10 using a removable memory card, such as a CompactFlash card and a card reader (not shown).

In order to provide affective information, the home computer 10 is connected to a keyboard 16 and a pointing device 18, such as a mouse or trackball. In a preferred embodiment, the pointing device 18 also includes sensors that can detect the user's physiological signals, including the GSR (Galvanic Skin Response). The home computer 10 is also connected to video camera 4. The video camera is also a sensor which captures video images of the face of the user 2, in order to record the facial expression of the user, and stores this video information on the hard drive storage 20 prior to processing by the CPU motherboard 12 The video camera 4 can be, for example, a DV325 tethered camera sold by Eastman Kodak Company. The camera connects to the home computer 10 via a cable employing a common interface, such as the Universal Serial Bus (USB) interface.

The home computer 10 is provided with appropriate software for creating and using personalized affective information in accordance with the present invention. This software is typically stored on hard drive 20, and can be provided on a CD-ROM disc (not shown). Alternatively, this software can be downloaded from the Internet via modem 22.

In a preferred embodiment, the home computer 10 determines affective information based on one of the following: a) a degree of preference extracted from facial expression; b) a degree of interest extracted from viewing time; and c) a degree of excitement extracted from galvanic skin response, or a combination of this information.

Figure 2:
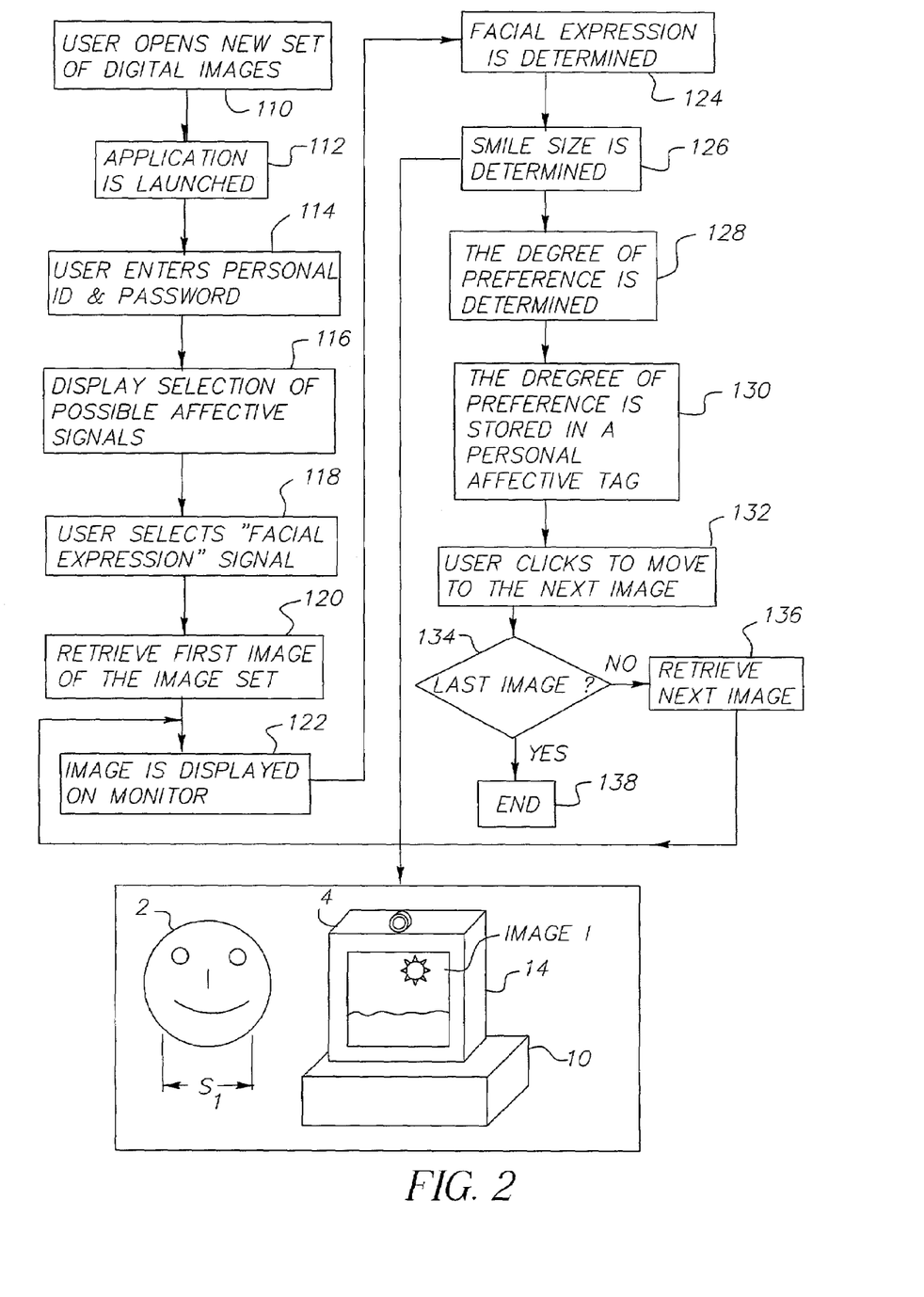
FIG. 2 is a flow diagram showing an embodiment of a system for providing affective information based on analysis of facial expressions.

Referring to FIG. 2, there is shown a flow diagram illustrating embodiment of the present invention for providing affective information based on the degree of preference of a particular user for each of a set of digital images. In this embodiment, affective information indicating a degree of preference for each image from a plurality of digital images is determined based on facial expression of the particular user.

In block 110, the user opens a new set of images by inserting the CD-ROM into the CD reader 26 of the home computer 10. The CD-ROM provides a database of digital images. Alternatively, the set of digital images can be provided using many other types of digital storage media, including magnetic disks and tape, optical discs, and solid-state memory. In a preferred embodiment, the CD-ROM also includes the software application that implements the method of FIG. 2. In this case, the software is automatically installed as part of block 112, if necessary, so that it can be used by CPU motherboard 12.

In block 112, the application which implements the method of the present invention is launched automatically, when a user views the images for the first time. Alternatively, the user can start the application manually and load a new set of images from the digital camera 24, the scanner 28, or from other image sources including the Internet.

In block 114, the user enters their personal ID and password. Alternatively, this step can be provided automatically by the operating system of the home computer 10 when the user "logs on" to the computer. In an alternative embodiment, the video camera 4 is used in conjunction with face recognition software to automatically determine the user, and provide an appropriate user identifier, such as their name or personal identification code.

In block 116, the home computer 10 provides a selection of signals that can be recorded in order to determine the user's emotional reaction as they view images.

In block 118, the user selects the desirable signal, i.e., facial expression in this case. In block 120, the home computer 10 retrieves the first image from the CD-ROM (or other image source) and in block 122, the home computer 10 displays the image on the monitor 14.

In block 124, the home computer 10 automatically analyses the facial expression of the user during the process of viewing images by processing images captured by the video camera 4. Frames of the video information are processed using a facial expression recognition algorithm. Facial expressions can be analyzed using a publicly disclosed algorithm for facial expression recognition such as an algorithm developed by Essa and Pentland (I. A. Essa and A. Pentland, [1995] "Facial Expression Recognition using a Dynamic Model and Motion Energy", In Proceedings of the ICCV 95, Cambridge, Mass.). Their algorithm is based on the knowledge of the probability distribution of the facial muscle activation associated with each expression and a detailed physical model of the skin and muscles. The physics-based model is used to recognize facial expressions through comparison of estimated muscle activations from the video signal and typical muscle activations obtained from a video database of emotional expressions.

Facial expressions can also be analyzed by means of other publicly available algorithms (e.g., J. J. Lien, T. Kanade, J. F. Cohn and C. C. Li, (2000) "Detection, Tracking, and Classification of Action Units in Facial Expression," Robotics and Autonomous Systems, 31, pp. 131-146, 2000; Bartlett, M. S., Hager, J. C., Ekman, P., and Sejnowski, T. J., [1999] "Measuring facial expressions by computer image analysis", Psychophysiology, 36, pp. 253-263). Their algorithms are based on recognizing specific facial actions movements—the basic muscle movements which were described by Ekman and Friesen (P. Ekman and W. Friesen, [1978] "Facial Action Coding System", Consulting Psychologists Press, Inc., Palo Alto, Calif.) in the Facial Action Coding System (FACS). The basic facial actions can be combined to represent any facial expressions. For example, a spontaneous smile can be represented by two basic facial actions: 1) the corners of the mouth are lifted up by a muscle called zygomaticus major; and 2) the eyes are crinkled by a muscle called orbicularis oculi. Therefore, when uplifted mouth and crinkled eyes are detected in the video signal, it means that a person is smiling. As a result of the facial expression analysis, a user's face can be recognized as smiling when a smile on user's face is detected, or not smiling when the smile is not detected.

In block 126, the home computer 10 determines the smile size. If the smile is not detected, the smile size equals 0. If a smile has been detected for a given image $_I$, a smile size $S_I$ for the image $_I$ is determined as the maximum distance between mouth corners within first three seconds after the onset of the specified image divided by the distance between the person's eyes. The distance between the person's eyes is determined using the facial recognition algorithms mentioned above. The necessity of taking the ratio between the size of the mouth and some measure related to the head of the person (e.g. the distance between the eyes) stems from the fact that the size of the mouth extracted from the video frame depends on the distance of the user to the video camera, position of the head, etc. The distance between the person's eyes is used to account for this dependency, however, other measures such as the height or width of the face, the area of the face and others measures can also be used.

In block 128, the home computer 10 determines the degree of preference. The degree of preference for the image $_I$ is defined as the smile size $_{S_I}$ for the image $_I$. If the smile was not detected, then the smile size and consequently the degree of preference is equal to 0.

In block 130, the home computer 10 creates a personal affective tag for the image $_I$ and stores the degree of preference in the personal affective tag as part of the image metadata. Alternatively, the degree of preference can be stored in a separate file in association with the user identifier and the image identifier.

In addition, the information about the date the user views a certain image can be also recorded as a separate entry into personal affective tag. Every time the user views the specified image a new personal affective tag is created which contains the user identifier, the degree of preference and the date when the image was viewed. As a result, images that were viewed more frequently would contain a bigger number of personal affective tags.

In block 132, the user clicks the pointing device 18 to indicate that they want to move to the next image. Alternatively, the user can provide some other form of input, such as hitting a key on the keyboard 16, providing an audio command, which is input by a microphone (not shown), providing a gesture captured by video camera 4, or using other input devices.

In block 134, the home computer 10 determines if this is the last image of the image set.

In block 136, if this is not the last image, the home computer 10 retrieves the next image of the image set and repeats blocks 122 through 134.

In block 138, if this is the last image, the home computer 10 stops the process of affective tagging.

Through the process of affective tagging the degree of preference can be determined and updated for all images in the database that were viewed by the user.

The degree of preference can be used in a digital imaging system to rank images in a systematic and continuous manner as favorite images for a specified user. This ranking can be done either based on the maximum degree of preference for each image (chosen among all personal affective tags created for this user and a specified image) or based on the cumulative degree of preference, which is defined as the sum of the degrees of preference for this user extracted from all relevant personal affective tags for the specified image.

The ranking can also be done for a specific time period. In this case, only the personal affective tags created during a desired period of time are considered.

In another embodiment, a binary degree of preference for images in an image database can be determined. When the smile is detected in block 124, the corresponding image is then classified as preferred with the binary degree of preference equals 1. Alternatively, when the smile is not detected, the image is classified as not preferred with the degree of preference equals 0.

The determined affective information in terms of the binary degree of preference is then stored as personal affective tag, which includes the user identifier as part of the image metadata. It can also be stored in a separate file on the computer together with the image identifier and the user identifier. In addition, affective information in terms of the actual frame(s) of the user's facial expression can also be stored in a separate file in association with the image identifier and the user identifier.

Yet in another embodiment, emotional category for images in an image database can be determined. The facial expression may be classified into a broader range of emotional categories, such as 'happy', 'sad', 'disgust', 'surprised', etc. As a result of facial recognition, images that evoke 'happy' facial expressions are assigned the 'happy' emotional category, images that evoke 'sad' facial expressions are assigned the 'sad' emotional category, etc. Images can be further classified using a range of values for these categories, such as strongly happy, somewhat happy, neutral and somewhat sad, and strongly sad, etc.

The determined affective information in terms of the emotional category is then stored as personal affective tag, which includes the user identifier as part of the image metadata. It can also be stored in a separate file on the computer together with the image identifier and the user identifier.

Figure 3:
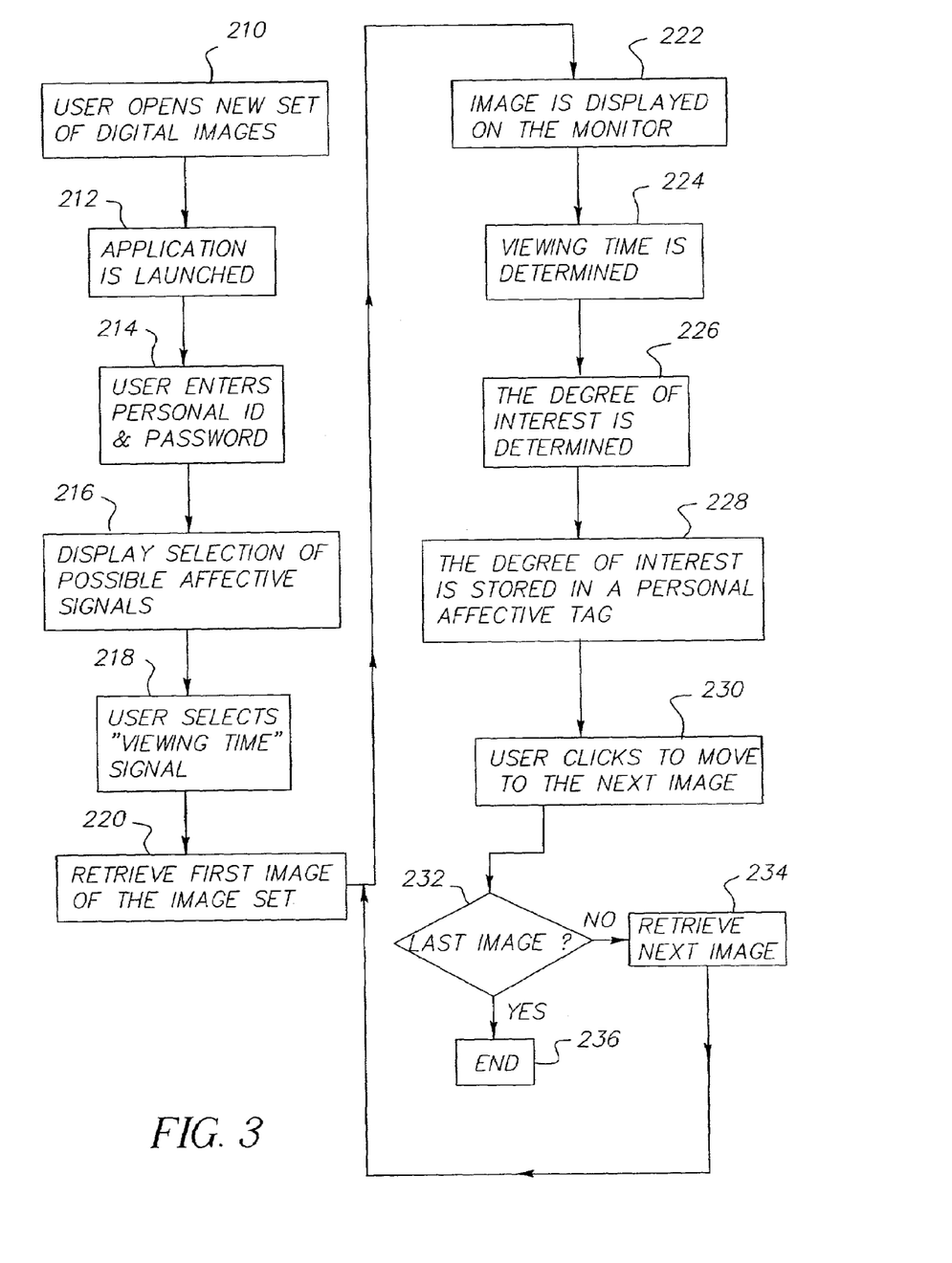
FIG. 3 is a flow diagram showing an embodiment of a system for providing affective information based on analysis of viewing time.

Referring to FIG. 3, there is shown a flow diagram illustrating another embodiment of the present invention for providing affective information based on the degree of interest of the particular user to a plurality of digital images. With this embodiment, a degree of interest is determined based on the viewing time, which is the time that the user views each digital image, before moving on to the next digital image.

The data described in a paper entitled "Looking at pictures: Affective, facial, visceral, and behavioral reactions", Psychophysiology, 30, pp. 261-273, 1993, by P. J. Lang, M. K. Greenwald, M. M. Bradley, and A. O. Hamm, indicates that on average, viewing time linearly correlates with the degree of the interest or attention an image elicit in an observer. Thus, such a relationship allows interpreting the viewing time as the user's degree of interest toward a specified image. Quoted publication by Lang et al. compares a viewing time with the degree of the interest for third party pictures only. In the present invention, a viewing time information is assessed for every individual for the first party as well as third party images and stored as a personal affective tag as part of the image metadata or in a separate file in association with the user identifier and the image identifier.

Recording of this signal implies that a user controls the time during which he or she observes an image. In the preferred embodiment, the user views images on the monitor screen of the PC and proceeds to the next image by pressing the mouse button or hitting a key. The following method to determine a degree of interest for every user and for every image is suggested and shown in FIG. 3.

In blocks 210 through 222, the method is the same as in blocks 110 through 122 in FIG. 2. In block 224, the home computer 10 determines the time interval $_{T_U}$ between two consecutive images $_I$ and $_J$.

In block 226, the home computer 10 determines the degree of interest. The degree of interest for the image I is defined as the time interval $_{T_U}$ when the image $_I$ was viewed.

To ensure that the viewing time is not improperly judged as a result of user distraction, the video camera 4 can be used to ensure that the user 2 is directing their gaze towards the monitor 14, and is not distracted by other tasks, or has even left the room.

In block 228, the home computer 10 creates a personal affective tag for the image $_I$ and stores the degree of interest in the personal affective tag as part of the image metadata. Alternatively, the degree of interest can be stored in a separate file in association with the user identifier and the image identifier.

In addition, the information about the date the user views a certain image can be also recorded as a separate entry into personal affective tag. Every time the user views the specified image a new personal affective tag is created which contains the user identifier, the degree of interest and the date when the image was viewed. As a result, images that were viewed more frequently would contain a bigger number of personal affective tags.

In blocks 230 through 236, the degree of interest is determined for all images in the database that were viewed by the user.

The degree of interest can be used in a digital imaging system to rank images in a systematic and continuous manner as favorite or important images for a specified user. This ranking can be done either based on the maximum degree of interest for each image (chosen among all personal affective tags created for this user and a specified image) or based on the cumulative degree of interest, which is defined as the sum of the degrees of interest for this user extracted from all relevant personal affective tags for the specified image.

The ranking can also be done for a specific time period. In this case, only the personal affective tags created during a desired period of time are considered.

Figure 4:
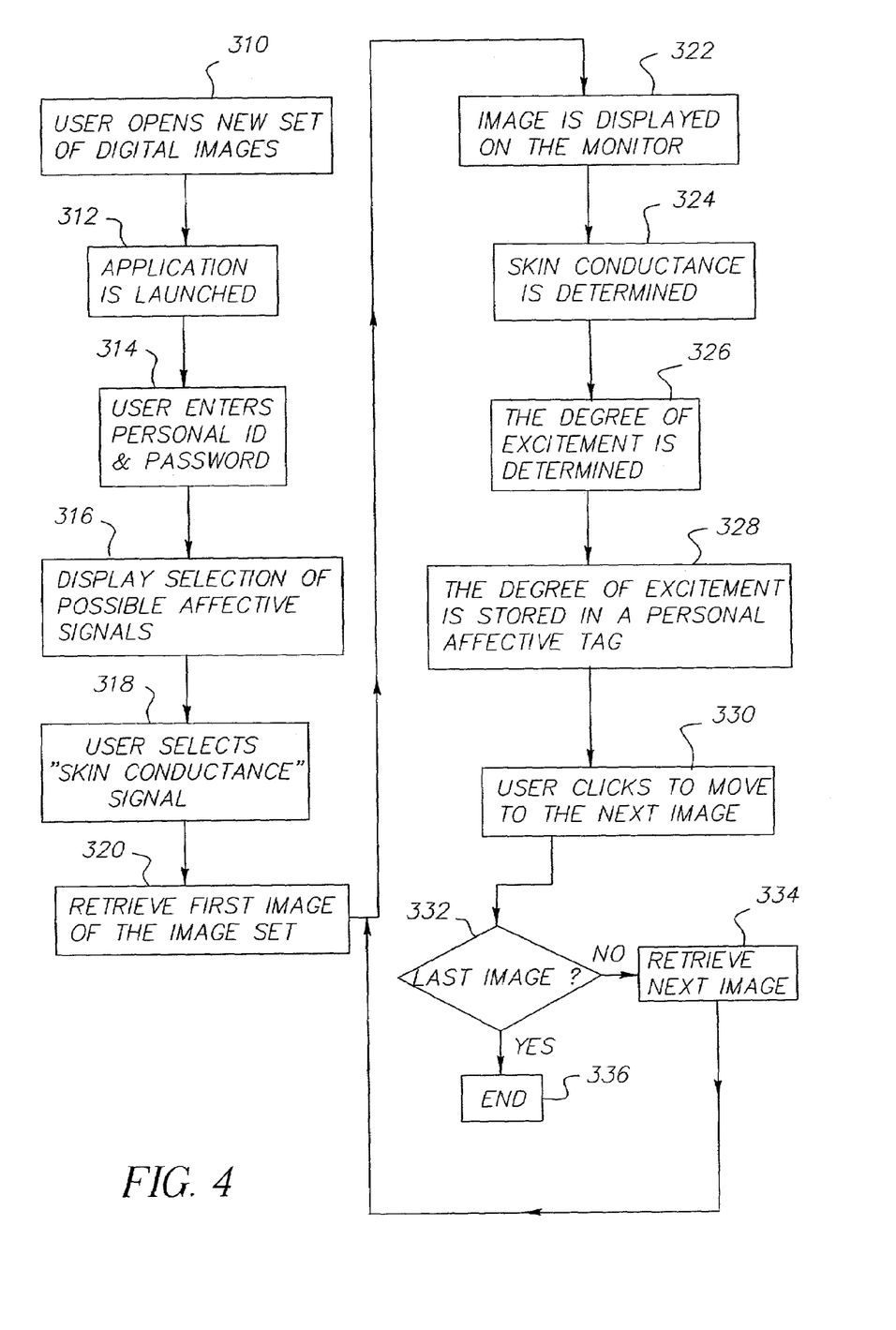
FIG. 4 is a flow diagram showing an embodiment of a system for providing affective information based on analysis of skin conductance.

Referring to FIG. 4, there is shown a flow diagram illustrating embodiments of the present invention for providing affective information based on the degree of excitement. With the present invention, a degree of excitement is determined based on the skin conductance.

Skin conductance is a measure of galvanic skin response. Skin conductance reflects a magnitude of the electrical conductance of the skin that is measured as a response to a certain event—viewing the image. As described in the paper "Looking at pictures: Affective, facial, visceral, and behavioral reactions", *Psychophysiology*, 30, pp. 261-273, 1993, by P. J. Lang, M. K. Greenwald, M. M. Bradley, and A. O. Hamm, skin conductance changes depending on the arousal the image elicits in the viewer: the higher the conductance, the lower the arousal or excitement, and vice versa: the lower the conductance, the higher the arousal. The measure of the amplitude of the skin conductance is also used to conclude about interest or attention.

The following method to determine a degree of excitement for every user and for every image is suggested and shown in FIG. 4.

In blocks 310 through 322, the method is the same as in blocks 210 through 222 in FIG. 3. In block 324, the home computer 10 determines the change in the skin conductance or $c_I$ during viewing an image $_I$. Skin conductance signal is detected through sensors in pointing device 18. The pointing device 18 can be a computer mouse such as IMB computer mouse with special bio-metric sensor that is able to detect and record skin conductance. Other devices can also be used such as various wearable devices for affective computing (computing emotional responses from physiological signals) developed at the MIT Media Lab (http://www.media.mit-.edu/affect/AC_research/wearables.html). An example of such device is the Galvactivator, a glove-like wearable device that senses the wearer's skin conductivity and maps its values to a bright LED display, created by Rosalind Picard and her colleagues (http://www.media.mit.edu/galvactivator/).

In block 326, the home computer 10 determines the degree of excitement. The degree of excitement for the image $_I$ is defined as the skin conductance $c_I$ when the image $_I$ was viewed.

To ensure that the change in skin conductance is elicited by the image and not by any other extraneous events, the video camera 4 can be used to check that the user 2 is directing their gaze towards the monitor 14, and is not distracted by other tasks, or has even left the room.

In block 328, the home computer 10 creates a personal affective tag for the image $_I$ and stores the degree of excitement in the personal affective tag as part of the image metadata. Alternatively, the degree of excitement can be stored in a separate file in association with the user identifier and the image identifier.

In addition, the information about the date the user views a certain image can also be recorded as a separate entry into personal affective tag. Every time the user views the specified image a new personal affective tag is created which contains the user identifier, the degree of excitement and the date when the image was viewed. As a result images that were viewed more frequently would contained a bigger number of personal affective tags.

In blocks 330 through 336, the degree of excitement is determined for all images in the database that were viewed by the user.

The degree of excitement can be used in a digital imaging system to rank images in a systematic and continuous manner as favorite, important or exciting images for a specified user. This ranking can be done either based on the maximum degree of excitement for each image (chosen among all personal affective tags created for this user and a specified image) or based on the cumulative degree of excitement, which is defined as the sum of the degrees of excitement for this user extracted from all relevant personal affective tags for the specified image.

The ranking can also be done for a specific time period. In this case, only the personal affective tags created during a desired period of time are considered.

In another embodiment the actual signal of galvanic skin response is stored as affective information either in a separate file on the computer 10 together with the image identifier and the user identifier, or in the personal affective tag as part of the image metadata.

Figure 5:
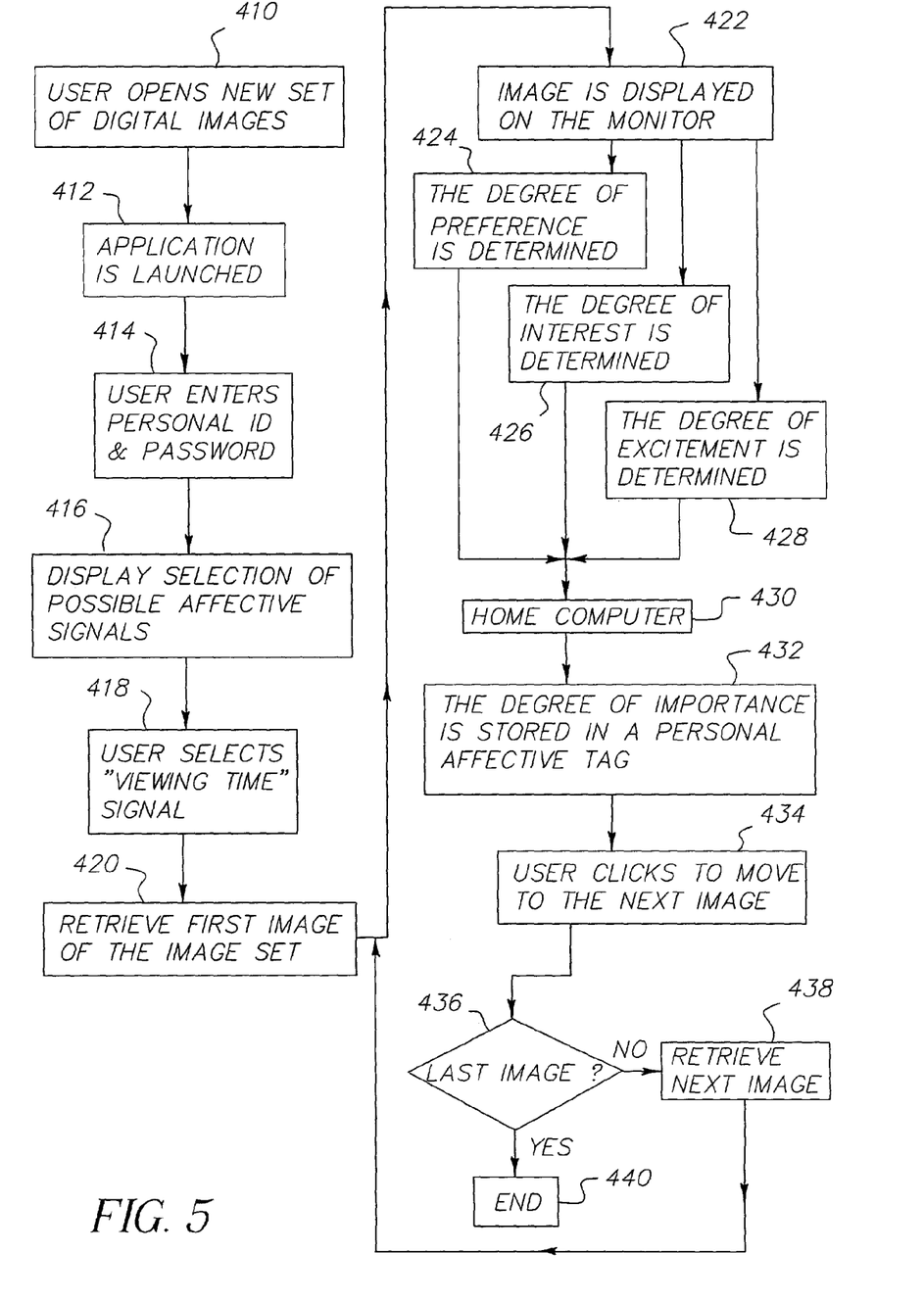
FIG. 5 is a flow diagram showing an embodiment of a system for providing affective information based on combined analysis of facial expressions, viewing time, and skin conductance.

Referring to FIG. 5, there is shown a flow diagram illustrating embodiment of the present invention for providing affective information based on the combination of the three affective signals described in the earlier paragraphs, namely, the degree of preference, the degree of interest and the degree of excitement, which are further combined to obtain an integral measure of positive importance.

In blocks 410 through 422, the method is the same as in blocks 210 through 222 in FIG. 2. In block 424, the home computer 10 determines the degree of preference based on facial expression (DP) the same way as in block 128 of FIG. 3. In block 426, the home computer 10 determines the degree of interest based on viewing time (DI) the same way as in block 226 of FIG. 4. In block 428, the home computer 10 determines the degree of excitement based on skin conductance (DE) the same way as in block 326 of FIG. 4.

In block 430, the home computer 10 determines the degree of positive importance (or "favoriteness") based on a sum of these three measures:

Positive Importance=$DP+DI+DE$

In another embodiment, the degree of positive importance is determined based on a weighted sum of these three measures, where the weights are determined based on the standard deviation within each of the normalized (divided by the maximum value) signals over the image set. In this case, the higher the standard deviation within the signal, the higher the weight of the contribution for the signal into the measure of positive importance. Consequently, the lower the standard deviation of a given signal, the lower the weight of the contribution for the corresponding signal into the measure of positive importance. The reason for this dependency stems from the assumption that a standard deviation of a particular measure reflects a degree of differentiation between the images along a given measure. This implies that the signal with the highest standard deviation has more differentiation power, and therefore is more important to consider while determining an integral measure of positive importance.

In block 432, the home computer 10 creates a personal affective tag for the image $_I$ and stores the degree of positive importance in the personal affective tag as part of the image metadata. Alternatively, the degree of positive importance can be stored in a separate file in association with the user identifier and the image identifier.

In addition, the information about the date the user views a certain image can also be recorded as a separate entry into personal affective tag. Every time the user views the specified image a new personal affective tag is created which contains the user identifier, the degree of positive importance and the date when the image was viewed. As a result images that were viewed more frequently would contained a bigger number of personal affective tags.

In blocks 434 through 440, the degree of positive importance is determined for all images in the database that were viewed by the user.

The degree of positive importance can be used in a digital imaging system to rank images in a systematic and continuous manner as favorite images for a specified user. This ranking can be done either based on the maximum degree of positive importance for each image (chosen among all personal affective tags created for this user and a specified image) or based on the cumulative degree of positive importance, which is defined as the sum of the degrees of positive importance for this user extracted from all relevant personal affective tags for the specified image.

The ranking can also be done for a specific time period. In this case only the personal affective tags created during a desired period of time are considered.

In another embodiment, different combinations of these three or other affective signals (such as derived from EEG, EMG, hand temperature, brain scan, eye movements and others) can be used to create the personal affective tag to classify images in accordance with a broader range of emotional categories, such as 'happy', 'sad', 'disgust', 'surprised', etc. Images can be further classified using a range of values for these categories, such as strongly happy, somewhat happy, neutral and somewhat sad, and strongly sad, etc.

The determined affective information in terms of the emotional category is then stored as personal affective tag, which includes the user identifier as part of the image metadata. It can also be stored in a separate file on the computer together with the image identifier and the user identifier.

Figure 6A:
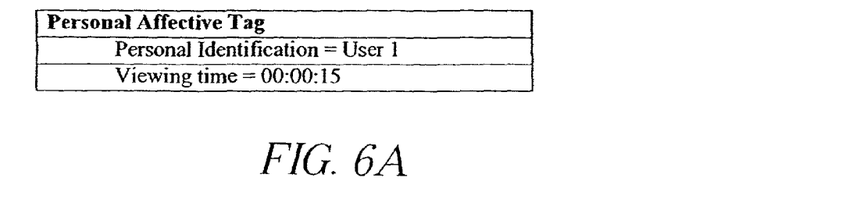
FIG. 6A is an example of a simple personal affective tag for a single user.

An illustrative example of a personal affective tag is shown in FIG. 6A. FIG. 6A depicts a file data structure for the simplest personal affective tag for a single user, which includes a personal identification field, and an affective field.

A personal identification code is stored in the personal identification field. This field identifies the user, whose affective information is stored in the personal affective tag.

Affective information is stored in the affective field. The affective information can be the result of automatic detection or a manual entry by the user.

The affective field identifies relevant data that represents or describes user's reactions toward images in terms of user's affective, cognitive, physiological, or behavioral responses. These data can be both raw recorded signals (e.g., skin conductance response) and/or interpreted information (e.g., the degree of positive importance). The affective field can also include basic emotion (e.g. happy) with a corresponding ranking that quantifies the intensity of the detected emotion.

The minimum required information contained in a personal affective tag consists of the personal identification code stored in the corresponding field, and affective information stored in the affective field. Other optional fields such as date and place of viewing, or other information can be included in a personal affective tag.

Figure 6B:
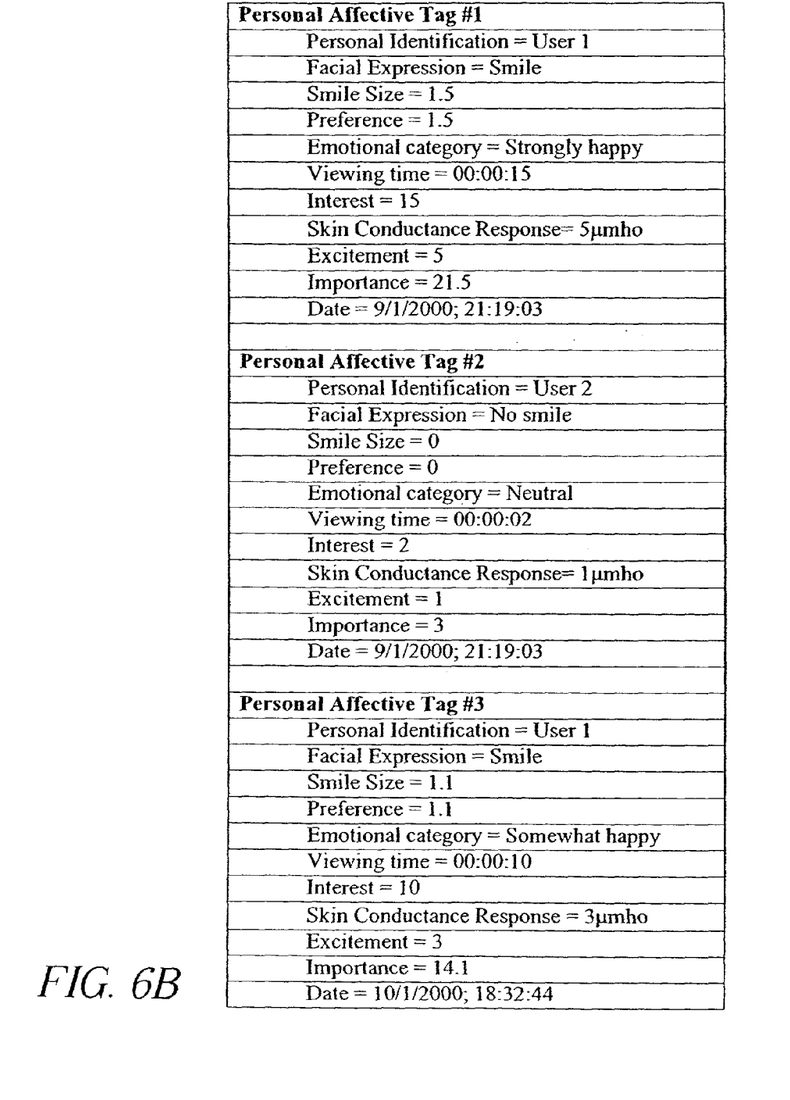
FIG. 6B is an example of affective metadata for multiple users with multiple personal affective tags.

An illustrative example of personal affective tags with optional fields is shown in FIG. 6A. Referring to FIG. 6B, there is shown an example data structure of affective metadata for a single image, which provides personalized affective information for multiple users. Personal affective tag #1 indicates that on Sep. 1, 2000, a computer stored the following affective information for the first user (user 1) viewing this image: Facial Expression=Smile; Smile size=1.5; The Degree of Preference=1.5; Emotional category=Strongly happy; Viewing time=15 sec; The Degree of Interest=15; Skin Conductance Response=5 $_\mu$mho; The Degree of Excitement=5; The Degree of Positive Importance=21.5.

Personal affective tag #2 indicates that later during the day of Sep. 1, 2000 the computer stored the following affective information for the second user (user 2) viewing the specified image: Facial Expression=No Smile; Smile size=0; The Degree of Preference=0; Emotional category=Neutral; Viewing time=2 sec; The Degree of Interest=2; Skin Conductance=1 $_\mu$mho; The Degree of Excitement=1; The Degree of Positive Importance=3.

According to the affective information, the specified image had a higher degree of preference, interest, excitement, and importance for the first user than for the second user.

Personal affective tag #3 indicates that on Oct. 1, 2000 the computer stored the following affective information for the first user (user 1) viewing the specified image: Facial Expression=Smile; Smile size=1.1; The Degree of Preference=1.1; Emotional category=Somewhat happy; Viewing time=10 sec; The Degree of Interest=10; Skin Conductance=3 $_\mu$mho; The Degree of Excitement=3; The Degree of Positive Importance=14.1.

According to this affective information, one month later the specified image slightly decreased its degree of preference, interest, excitement, and importance for the first user.

The method for providing affective information described in detail previously in the present invention for the case of picture viewing can also be utilized during the process of picture taking. In this case, the imaging capture device would need to be supplied with for example, a bio-sensor and ability to capture the face of a picture taker.

The present invention can be used as part of a system for retrieving images using affective information, and for producing album pages and other hardcopy photo products using affective information, as described in commonly assigned U.S. patent application Ser. No. 10/079,646, filed Feb. 19, 2002 entitled "Method for Providing Affective Information in an Imaging System" by Elena A. Fedorovskaya et al.; and Ser. No. 10/079,284, filed Feb. 19, 2002 entitled "Method for Using Facial Expression to Determine Affective Information in an Imaging System" by Serguei Endrikhovski et al.; the disclosures of which are incorporated herein by reference.

A computer program product can include one or more storage medium, for example; magnetic storage media such as magnetic disk (such as a floppy disk) or magnetic tape;

optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST 2 user
4 video camera
10 home computer systems
12 CPU motherboard
14 monitor
16 keyboard
18 pointing device with physiology sensors
20 hard drive
22 modem
24 digital still camera
26 CD reader
28 scanner
30 Internet service provider
32 modem
110 block
112 block
114 block
116 block
118 block
120 block
122 block
124 block
126 block
128 block
130 block
132 block
134 block
136 block PARTS LIST (con't)

138 block
210 block
212 block
214 block
216 block
218 block
220 block
222 block
224 block
226 block
228 block
230 block
232 block
234 block
236 block
310 block
312 block
314 block
316 block
318 block
320 block
322 block
324 block
326 block
328 block
330 block
332 block PARTS LIST (con't)

334 block
336 block
410 block
412 block
414 block
416 block
418 block
420 block
422 block
424 block
426 block
428 block
430 block
432 block
434 block
436 block
438 block
440 block

What is claimed is:

1. A method for providing image metadata for still digital images captured by a user and stored in respective digital image files in an imaging system, comprising:
   a) sequentially displaying on an electronic display the still digital images from their respective digital image files for viewing by the user;
   b) electronically monitoring the time intervals during which the user views each of the still digital images on the electronic display, wherein the time intervals are determined by the user;
   c) using the time intervals to determine the degree of interest for each of the stored still digital images;
   d) storing image metadata indicating the degree of interest for each of the still digital images in their respective digital image files; and
   e) subsequently using the metadata stored in each respective digital image file to assist in retrieving one or more still digital images.

2. The method of claim 1 wherein the degree of interest is determined by relating the viewing time duration for each still digital image with the average viewing time duration for all of the still digital images.

3. The method of claim 1 further including the step of monitoring the facial expression of the user.

4. The method of claim 3 wherein the smile size of the user is determined for each of the still digital images.

5. The method of claim 4 wherein a degree of preference is determined for each of the still digital images by relating the smile size corresponding to each still digital image to an average smile size.

* * * * *